United States Patent [19]

Fujita

[11] Patent Number: 5,151,894
[45] Date of Patent: Sep. 29, 1992

[54] DISK CARTRIDGE SHUTTER

[75] Inventor: Minoru Fujita, Toride, Japan

[73] Assignee: Hitachi Maxell, Ltd., Osaka, Japan

[21] Appl. No.: 809,254

[22] Filed: Dec. 18, 1991

Related U.S. Application Data

[63] Continuation of Ser. No. 407,924, Sep. 15, 1989, abandoned.

[30] Foreign Application Priority Data

Sep. 20, 1988 [JP] Japan .................... 63-233621

[51] Int. Cl.⁵ .................... B11B 3/70; B11B 5/84; B11B 7/26; B11B 23/03
[52] U.S. Cl. .................... 369/291; 360/133
[58] Field of Search .................... 360/133; 364/291

[56] References Cited

U.S. PATENT DOCUMENTS

| | | | |
|---|---|---|---|
| 3,746,607 | 7/1973 | Harmon et al. | 428/167 |
| 4,404,162 | 9/1983 | Miki et al. | 264/550 |
| 4,627,532 | 12/1986 | Clemens | 206/444 |
| 4,698,714 | 10/1987 | Sugawara et al. | 369/291 |
| 4,816,316 | 3/1989 | Robbins, III | 428/167 X |

FOREIGN PATENT DOCUMENTS

| | | |
|---|---|---|
| 236100 | 9/1987 | European Pat. Off. |
| 260898 | 3/1988 | European Pat. Off. |
| 264237 | 4/1988 | European Pat. Off. |
| 353000 | 1/1990 | European Pat. Off. |
| 2087624 | 5/1982 | United Kingdom |

Primary Examiner—John W. Shepperd
Assistant Examiner—Michael C. Kessell
Attorney, Agent, or Firm—Birch, Stewart, Kolasch & Birch

[57] ABSTRACT

A disk cartridge with an integral plastic shutter for shutting/opening an aperture formed in a cartridge case rotatably accommodating a disk-shaped recording medium therein characterized in that a faceplate part of the shutter has an outer surface including a large number of ridges. The shutter of this disk cartridge has a high dimensional stability and mechanical strength.

11 Claims, 5 Drawing Sheets

DISK CARTRIDGE SHUTTER

This application is a continuation of application Ser. No. 07/407,924 filed on Sep. 15, 1989, now abandoned.

BACKGROUND OF THE INVENTION

1. Field of the Invention

The present invention relates to a disk cartridge and in particular to an improved integrally-molded plastic shutter of the disk cartridge.

2. DESCRIPTION OF THE RELATED ART

A prior-art disk cartridge shutter is made for example of an about 0.2 mm thick U-shaped stainless steel plate. Since, however, the stainless steel plate is disadvantageous because it is difficult to attain high dimensional accuracy in the stainless steel plate, the cartridge case of plastic is likely to be abraded by the edge of the steel plate, and the shutter is easily detached from the cartridge case upon impact when the disk cartridge is dropped. Under these circumstances, research and development of the integrally molded plastic shutter has been carried out.

The plastic shutter must be molded in the form of a thin-walled product because the restricted thickness of the disk cartridge restricts the thickness of the shutter therefor. When the thin shutter is injection-molded a molten plastic flows at a high speed in the injection molds, and therefore the molten plastic is subjected to a shear stress and molecules of molten plastic are likely to be stretched in a flow direction of the molten plastic and solidified to have a molecular orientation. Since the stretched plastic molecules are subject to a residual stress causing them to be restored to their initial or unstretched condition, the conventional plastic shutters thus produced entail a problem in that they experience a dimensional change and a deformation with passage of time when they are left in a high-temperature environment. In addition, since the molecular orientation causes the plastic molecules to be less entangled in the direction transverse to the flow direction of the molten plastic, the resulting thinly molded plastic shutter may be readily split or broken along the flow direction of the molten plastic.

SUMMARY OF THE INVENTION

An object of the present invention is to provide a disk cartridge with a shutter having a high dimensional stability and mechanical strength by overcoming disadvantages of the conventional shutter where the molecular orientation of the plastic has reduced the dimensional stability and mechanical strength.

In order to achieve the above object, the present invention is characterized by a disk cartridge with an integrally molded plastic shutter for shutting/opening an aperture defined in a cartridge case rotatably accomodating a disk-shaped recording medium therein, the shutter having faceplates, the outer surface of at least one of which has a multiplicity of ridges, such as in a striped pattern, to create a certain ruggedness. When a shutter with such a rugged faceplate surface is molded, the molten plastic flow is disturbed so that the plastic molecules are not likely to be stretched in the flow direction of the molten plastic. Thus, the occurrence of a residual stress is reduced and the molten plastic molecules are more likely to be entangled transversely to the flow direction of the molten plastic.

The present invention has advantages in that the reduced molecular orientation of the molten plastic due to a disturbance in the molten plastic flow by the complementarily ridged, rugged face of the mold, increases the dimensional stability of the shutter and restrains the shutter from being split along the flow direction of the molten plastic.

BRIEF DESCRIPTION OF THE DRAWINGS

The above-mentioned objects as well as the above-mentioned features of the present invention will be apparent from the following description of the preferred embodiments of the invention with reference to the drawings in which.

DETAILED DESCRIPTION OF THE PREFERRED EMBODIMENTS

The preferred embodiments of the present invention will be described with reference to the drawings.

Figure 1:
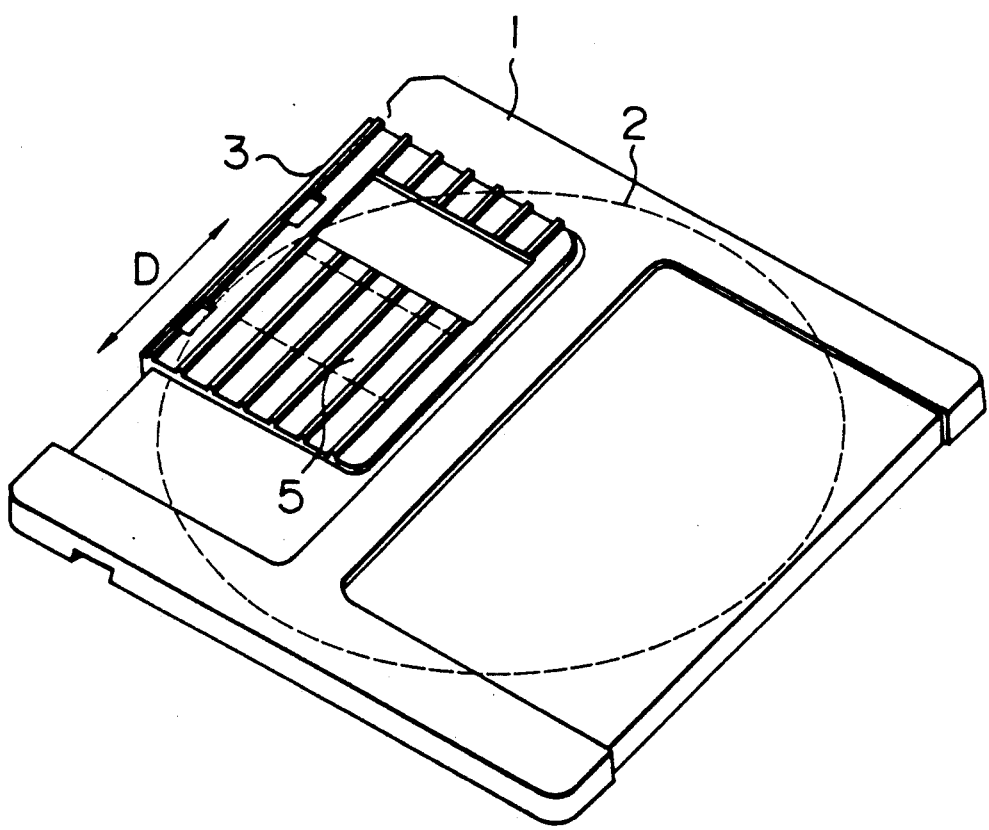
FIG. 1 is a perspective view of a disk cartridge according to one embodiment of the present invention.

FIG. 1 illustrates a disk cartridge with a shutter made according to an embodiment of the present invention.

A cartridge case 1 rotatably accomodates a disk-shaped record medium 2. A front side of the cartridge case 1 has a head insertion hole 5 for head access. A shutter 3 movable in the direction D shuts and opens the head insertion hole 5.

Figure 2:
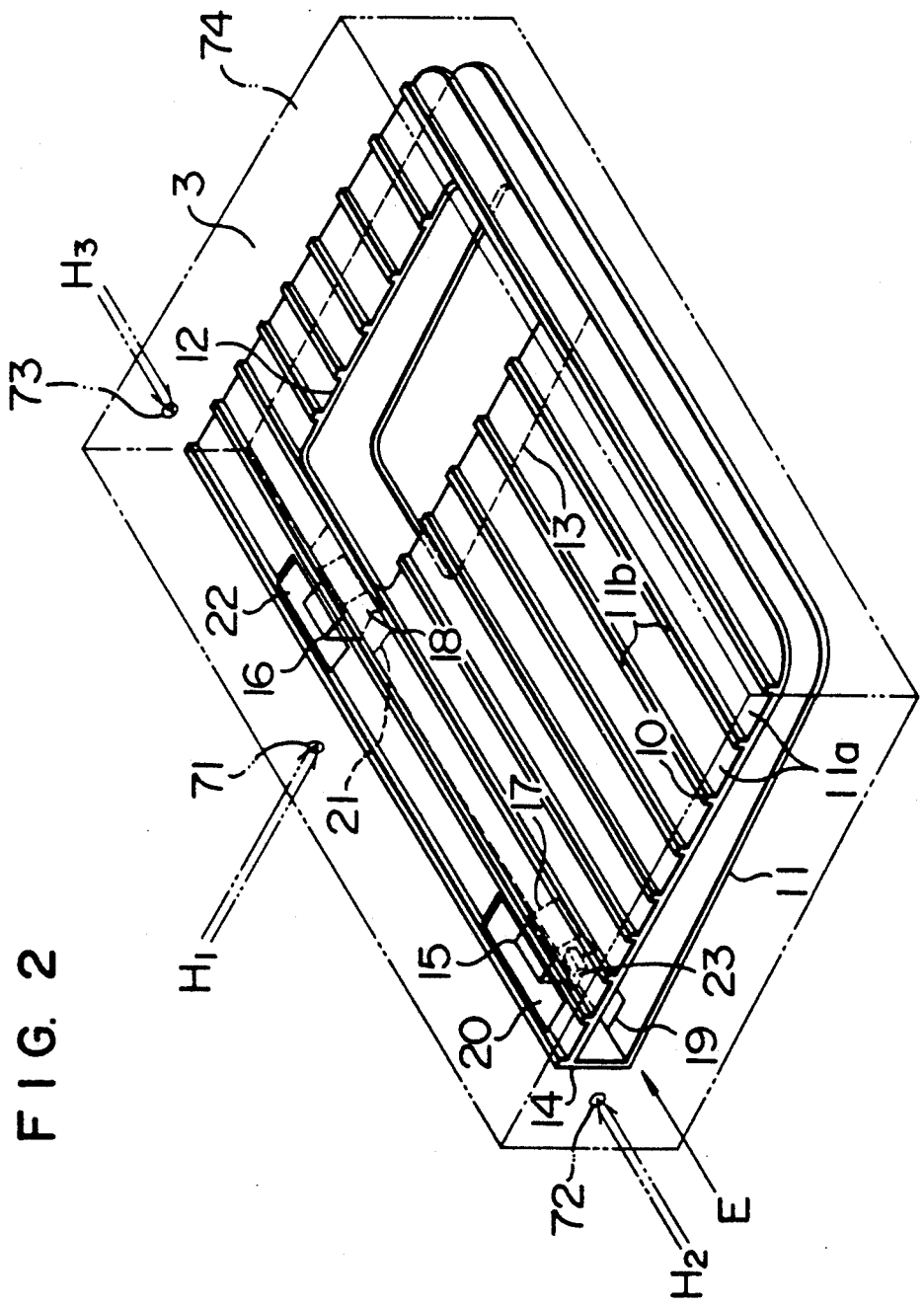
FIG. 2 is a perspective view of a shutter of the disk cartridge of FIG. 1.

FIG. 2 is a perspective view of the shutter 3 shown in FIG. 1. The shutter 3 is essentially U-shaped when viewed in the direction E and has a pair of faceplates 10 and 11. The respective faceplates 10 and 11 have head insertion holes 12 and 13.

Columnar portions 15 and 16 extend from an inner surface of a joint part 14 connecting the faceplates 10 and 11 toward the cartridge case 1. The front ends of the respective columnar portions 15 and 16 include arrowhead-shaped engagement claws 17 and 18. Openings 19, 20, 21 and 22 are formed in parts of the faceplates 10 and 11, opposite to the engagement claws 17 and 18, so that the columnar portions 15 and 16 can be viewed from outside. The engagement claw 17, as shown in the left-hand side of FIG. 2, includes an integral hook 23 to be engaged with a shutter spring.

Parallel grooves 11a and ridges 11b are formed on the surface of the faceplate part 10. The production process, as well as the advantages of the grooves and ridges, will be explained hereinafter together with the modifications referred to in FIGS. 3 to 10.

Figure 3:
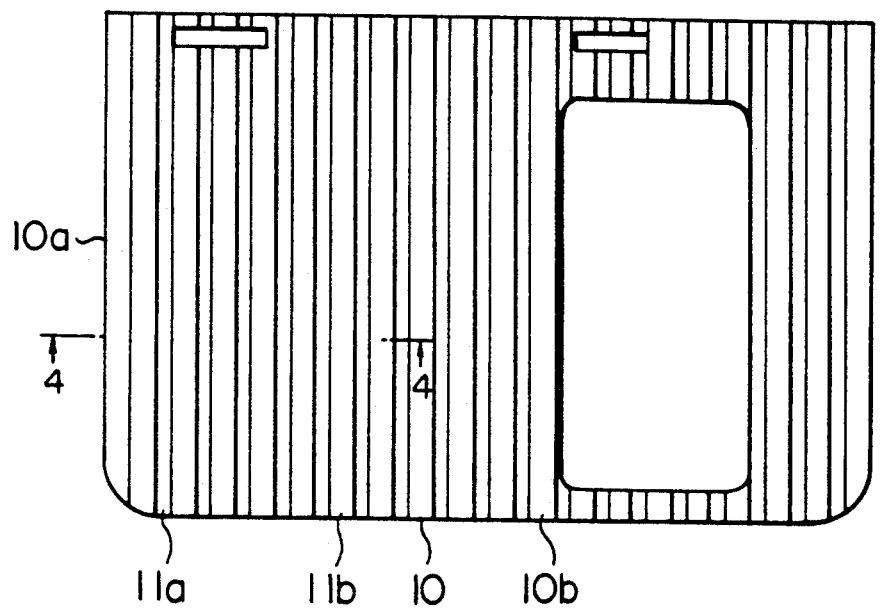
FIG. 3 is a plan view of a first modification of the shutter of FIG. 2.
Figure 4:
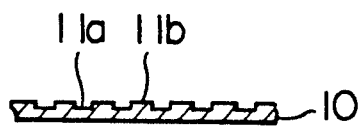
FIG. 4 is a sectional view taken along a line A—A in FIG. 3.

FIG. 3 is a plan view of a first modification of a shutter surface of FIG. 2. FIG. 4 is a sectional view taken along the line A—A in FIG. 3.

A large number of grooves 11a, each of which is 0.3 mm wide and 20 μm deep, and a large number of ridges 11b, each of which is 0.5 mm wide, are arranged alternately with each other in parallel to the shorter side 10a of the rectangular faceplate 10 having a 48 mm longer side 10b, a 32 mm shorter side 10a and from 0.3 mm–0.4 mm of thickness. The faceplate 10 is integrally injection-molded of a crystalline plastic, such as polyacetal or polypropylene. Each of the grooves 11a in the surface of the faceplate 10 has a glossy bottom surface, while each of the ridges 11b on the surface of the faceplate 10 has a figured top surface, so that the surface of the faceplate 10 bears a striped pattern.

Figure 5:
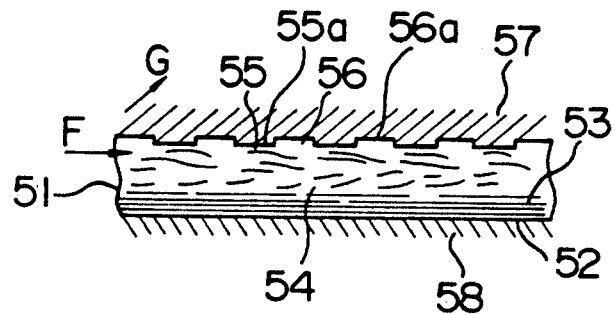
FIG. 5 is a diagrammatic view illustrating the state of a plastic flow in the molds.

FIG. 5 diagrammatically illustrates the flow of the plastic material in injection molds 57, 58, where the shutter of the sectional arrangement as shown in FIG. 4 is formed.

When a molten plastic is flows in a passage 51 of the injection mold 57, 58, one of which has a flat molding surface 158, and the other of which, 57, has a molding surface with a large number of alternate grooves 56a and ridges 55a, in the direction F transverse to the extending direction G of the grooves 56a and ridges 55a, so as to mold a shutter, the flow passage 51 for the molten plastic in the injection molds 57, 58, periodically changes in its flow direction F.

A periodic change in the molding surface arrangement of the injection molds 57, 58 changes the flow resistance as the molten plastic flows in the injection molds 57, 58.

A fluctuation or variation in molecular orientation in the thickness direction of the injection-molded plastic plate has been described above. In addition, when the flow direction F of the molten plastic is inclined by a certain angle with respect to the extending direction of the grooves 56a and ridges 55a, a fluctuation or variation in molecular orientation will occur in the direction perpendicular to the flow direction F, which results in an intermolecular entanglement transverse to the molten plastic flow to increase a bonding strength of the molecules constituting the molded product or shutter.

The injection of the molten plastic may be carried out through one of inlets 71, 72 and 73 of the injection mold 74 in the direction $H_1$, $H_2$ or $H_3$, as shown by phantom lines in FIG. 2, such that the injected molten plastic will flow transversely with respect to the extending direction of the grooves and ridges, at least partly when the molten plastic expands all over the plane to form the face plate 10.

An oriented layer 53 is produced close to a flat wall surface 52, while the degree of orientation is lowered at a position more remote from the surface 52 in the thickness direction due to the disturbance of the flow caused by the alternate grooves and ridges, to produce a not-oriented or less oriented layer 54. In a region close to the mold 57, relatively oriented layers 55 are produced adjacent and in parallel to the groove surfaces 55a of the injection mold 57 and relatively less oriented layers 56 are produced adjacent and in parallel to the ridge surfaces 56a of the injection mold 57. Thus, the orientated layers 55 result in the grooves 11a of the molded product 3 released from the injection mold 57, 58 each with glossy bottom surfaces while the less oriented layers 56 result in the ridges 11b of the molded product released from the injection mold 57, 58 each with figured top surfaces, so that the residual stress in the injection-molded shutter 3 caused by the excessive molecular orientation is reduced and the dimensional stability of the shutter 3 is increased.

Figure 6:
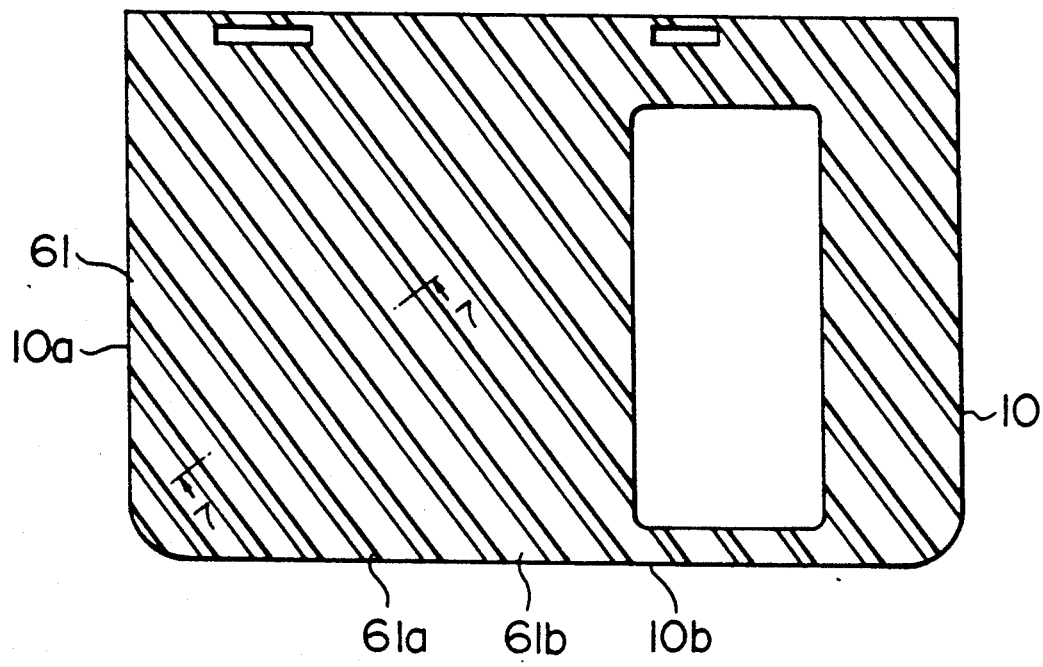
FIG. 6 is a plan view of a second modification of the shutter of the present invention.
Figure 7:
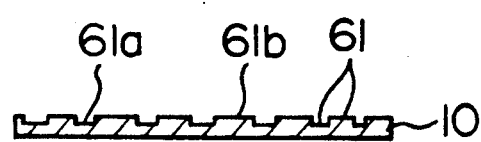
FIG. 7 is a sectional view taken along a line B—B in FIG. 6.

FIG. 6 is a plan view of a second modification of the shutter surface of the present invention. FIG. 7 is a sectional view taken along the line B—B in FIG. 6. A shutter surface 61 includes a large number of alternate grooves 61a and ridges 61b parallel to each other and both oblique at a predetermined angle with respect to the shorter side 10a of a rectangular shutter face plate 10. Also, in accordance with the second embodiment, one half of an injection mold having on an inner surface thereof grooves and ridges corresponding to the ridges 61b and grooves 61a of the face plate 10 is placed so that the extending direction of the grooves and ridges cross directions of a molten plastic flow in the injection mold when the shutter is molded. Thus, the grooves 61a each with glossy bottom surfaces and the ridges 61b each with figured top surfaces are produced.

Figure 8:
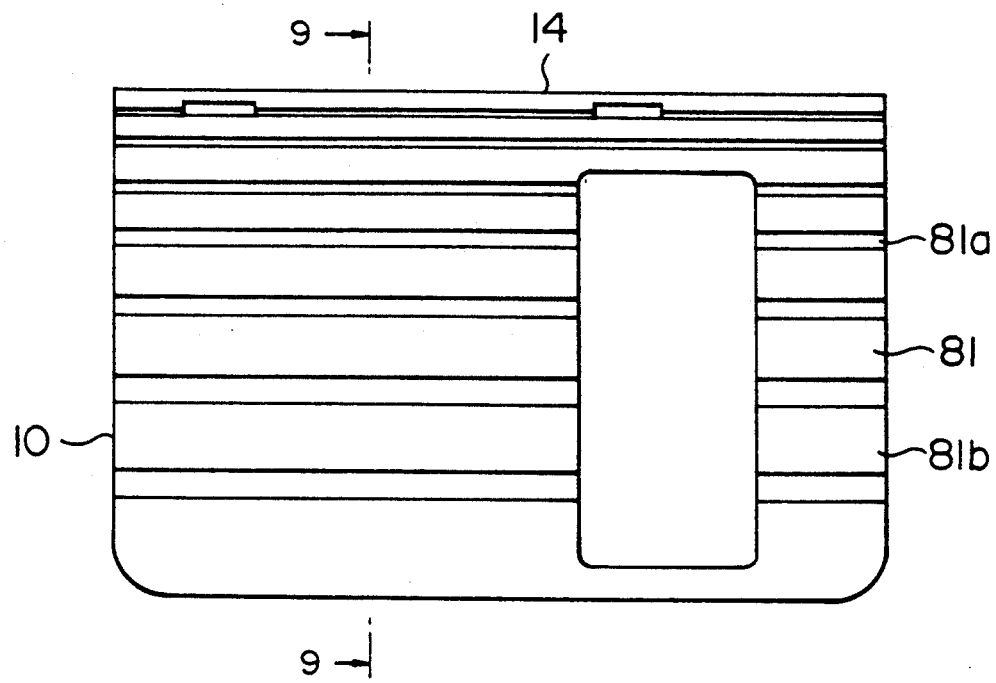
FIG. 8 is a plan view of a third modification of the shutter of the present invention.
Figure 9:
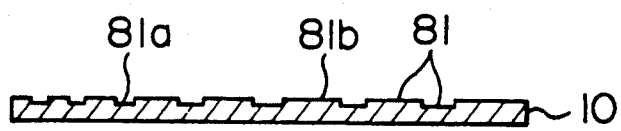
FIG. 9 is a sectional view taken along a line C—C in FIG. 8.

FIG. 8 is a plan view of a third modification of a shutter surface of the present invention. FIG. 9 is a sectional view taken along the line C—C in FIG. 8. At positions closer to a shutter joint 14 of a shutter surface 81, widths of alternate grooves 81a and ridges 81b, parallel to each other, are narrower. In other words, widths of the alternate grooves 81a and ridges 81b increase at positions closer to the side opposite to the shutter joint 14 of the shutter surface 81.

Figure 10:
FIG. 10 is a sectional view of a main portion of a fourth modification of the shutter of the present invention.

FIG. 10 is a sectional view, similar to FIGS. 4, 7 and 9, of the shutter of a fourth modification of the present invention. This shutter surface includes flat glossy surfaces 101 and figured surfaces 102 having ridges each with generally triangular cross-sections.

The shutter surfaces of the embodiments above show only examples of the present invention. In summary, when in a molding process of a shutter, an injection mold having a surface with continuous or intermittent grooves and ridges is used to flow molten plastic thereover in a direction transverse, preferably perpendicular, to the extending direction of the grooves and ridges, a molecular orientation of the shutter faceplate thus molded is moderated and the dimensional stability of the shutter faceplate is enhanced.

The striped patterns of the embodiments above, formed on one side surface of the shutter can serve as a means for identifying the side as a predetermined one of front and rear sides.

Although the engagement claws 17 and 18 for engaging the shutter 3 with the cartridge case 2 and for guiding the shutter 3 are generally arrowhead-shaped and the columnar portions 15 and 16 extend from the inner surface of the joint 14 in the embodiment above, engagement claws may extend from one faceplate to the other faceplate of the shutter. The disk of the disk cartridge may be not only a magnetic disk cartridge but also an optical disk cartridge or magneto-optical disk cartridge.

Alternatively, the surfaces of both the faceplates 10 and 11 of the shutter may include such grooves and ridges as described above instead of the surface of only one of the faceplates 10, 11.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A disk cartridge comprising a cartridge case and an integrally molded plastic shutter for shutting and opening an aperture formed in said cartridge case, said cartridge case rotatably accommodating a disk-shaped recording medium, said plastic shutter comprising face plates having an outer surface which includes a ridged surface of a multiplicity of ridges and grooves therein arranged in the form of a pattern wherein said multiplicity of ridges and grooves extend in a direction which intersects a direction of molten plastic flow when said shutter is molded, said face plate of said plastic shutter near said outer surface, including said multiplicity of ridges and grooves, comprises a degree of molecular orientation lower in comparison with that of that portion of said face plate near an opposite inner surface thereof.

2. A disk cartridge as in claim 1, wherein said ridges and grooves of said ridged surface are arranged in the form of a striped pattern.

3. A disk cartridge as in claim 1, wherein said multiplicity of ridges and grooves of said ridged surface extend in a direction transverse to a direction of molten plastic flow when said shutter is molded.

4. A disk cartridge as in claim 1, wherein said shutter is integrally molded of a crystalline plastic.

5. A disk cartridge as in claim 4, wherein said crystalline plastic comprises a material selected from at least one member of the group consisting of polyacetal and polypropylene.

6. A disk cartridge as in claim 1, wherein said plastic shutter has at least one columnar portion, having an arrowhead shaped claw for engaging said shutter with said cartridge case, extending from an inner surface of a joining portion of said shutter, connecting said face plate of said shutter to said cartridge case.

7. A disk cartridge as in claim 6, wherein a portion of said face plate of said shutter, opposite to said columnar portion for engaging said shutter with said cartridge case, has an opening therein.

8. A disk cartridge as in claim 1, wherein said shutter has a head insertion hole therein.

9. A disk cartridge as in claim 1, wherein said face plate of said shutter comprises a surface which includes relatively non-oriented molecules near the ridged surface thereof and relatively oriented molecules near the grooved surface thereof.

10. A disk cartridge as in claim 1, wherein said multiplicity of ridges and grooves of said ridged surface of said outer surface of said plastic shutter extend in a direction obliquely to a direction of flow of molten plastic when said shutter is molded.

11. The disk cartridge as in claim 1, wherein said grooves in said outer surface of said face plate have a glossy surface and said ridges have a figures surface.

* * * * *